US008706866B2

(12) United States Patent
Noh et al.

(10) Patent No.: US 8,706,866 B2
(45) Date of Patent: Apr. 22, 2014

(54) VIRTUAL SERVER AND METHOD FOR IDENTIFYING ZOMBIE, AND SINKHOLE SERVER AND METHOD FOR INTEGRATEDLY MANAGING ZOMBIE INFORMATION

(75) Inventors: Sang Kyun Noh, Gwangju (KR); Young Tae Yun, Daejeon (KR); Dong Soo Kim, Pohang-si (KR); Yo Sik Kim, Daejeon (KR); Yoon Jung Chung, Seongnam-si (KR); Won Ho Kim, Daejeon (KR); Yu Jung Han, Suwon-si (KR); Cheol Won Lee, Daejeon (KR)

(73) Assignee: Eletronics and Telecommunications Research Institute, Daejeon (KR)

( * ) Notice: Subject to any disclaimer, the term of this patent is extended or adjusted under 35 U.S.C. 154(b) by 232 days.

(21) Appl. No.: 12/985,728

(22) Filed: Jan. 6, 2011

(65) Prior Publication Data
US 2011/0270969 A1    Nov. 3, 2011

(30) Foreign Application Priority Data

Apr. 28, 2010   (KR) .................. 10-2010-0039332

(51) Int. Cl.
*G06F 21/20* (2006.01)
*G06F 15/173* (2006.01)

(52) U.S. Cl.
USPC ............... 709/224; 715/734; 715/736; 380/2; 370/254

(58) Field of Classification Search
USPC .................. 709/224, 227, 228; 715/734, 736; 380/2; 270/254
See application file for complete search history.

(56) References Cited

U.S. PATENT DOCUMENTS 7,568,232 B2   7/2009  Mitomo et al.
8,112,804 B2 *  2/2012  Kwon et al. .................... 726/23
(Continued)

FOREIGN PATENT DOCUMENTS

JP   2005-149239 A   6/2005
JP   2005-341217 A   12/2005
(Continued)

OTHER PUBLICATIONS

Srikanth Kandula et al., "Botz-4-Sale: Surviving Organized DDoS Attacks That Mimic Flash Crowds", NSDI'05 Proceedings of the 2nd conference on Symposium on Networked Systems Design & Implementation, USENIX Association, vol. 2, p. 287-300, 2005.

(Continued)

*Primary Examiner* — Jason K. Gee
*Assistant Examiner* — Sharif E Ullah
(74) *Attorney, Agent, or Firm* — LRK Patent Law Firm (57) ABSTRACT

Provided are a virtual server and method for identifying a zombie, and a sinkhole server and method for integratedly managing zombie information. The virtual server includes an authentication processing module authenticating a host using a CAPTCHA test and providing a cookie to the authenticated host when a web server access request message received from the host does not include a cookie, a cookie value verification module for extracting a cookie value from the web server access request message and verifying the extracted cookie value when the web server access request message includes a cookie, a web page access inducement module for inducing the host to access a web server when the cookie value is verified, and a zombie identification module for blocking access of the host when the cookie value is not verified, and identifying the host as a zombie when the number of blocking operations exceeds a threshold value.

6 Claims, 6 Drawing Sheets

(56) References Cited

U.S. PATENT DOCUMENTS

| | | |
|---|---|---|
| 8,132,255 B2 | 3/2012 | Mates |
| 2003/0026220 A1* | 2/2003 | Uhlik et al. ............... 370/328 |
| 2004/0250124 A1* | 12/2004 | Chesla et al. ............. 713/201 |
| 2005/0216845 A1* | 9/2005 | Wiener ..................... 715/745 |
| 2007/0156592 A1* | 7/2007 | Henderson ................ 705/51 |
| 2008/0059596 A1* | 3/2008 | Ogawa ...................... 709/207 |
| 2009/0006569 A1 | 1/2009 | Morss et al. |
| 2010/0125668 A1* | 5/2010 | Bocchieri et al. ......... 709/228 |
| 2010/0162350 A1 | 6/2010 | Jeong et al. |
| 2010/0192201 A1* | 7/2010 | Shimoni et al. ............ 726/3 |
| 2010/0325588 A1* | 12/2010 | Reddy et al. ............... 715/853 |
| 2010/0325706 A1* | 12/2010 | Hachey ...................... 726/6 |
| 2011/0035505 A1* | 2/2011 | Jakobsson .................. 709/229 |
| 2011/0208714 A1* | 8/2011 | Soukal et al. .............. 707/709 |
| 2011/0270969 A1* | 11/2011 | Noh et al. .................. 709/224 |
| 2011/0283359 A1* | 11/2011 | Prince et al. ............... 726/23 |
| 2012/0090030 A1* | 4/2012 | Rapaport et al. ........... 726/23 |

FOREIGN PATENT DOCUMENTS

| | | |
|---|---|---|
| JP | 2006-107524 A | 4/2006 |
| JP | 2009-054136 A | 3/2009 |
| JP | 2009-301554 A | 12/2009 |
| KR | 10-0602920 B1 | 7/2006 |
| KR | 10-0900491 B1 | 5/2009 |
| KR | 10-2010-0074480 A | 7/2010 |
| KR | 10-2010-0075043 A | 7/2010 |
| KR | 10-2010-0098241 A | 9/2010 |

OTHER PUBLICATIONS

Srikanth Kandula et al., "Botz-4-Sale: Surviving Organized DDoS Attacks That Mimic Flash Crowds", USENIX Association, vol. 2, pp. 287-300, 2005.

* cited by examiner

VIRTUAL SERVER AND METHOD FOR IDENTIFYING ZOMBIE, AND SINKHOLE SERVER AND METHOD FOR INTEGRATEDLY MANAGING ZOMBIE INFORMATION

CROSS-REFERENCE TO RELATED APPLICATION

This application claims priority to and the benefit of Korean Patent Application No. 10-2010-0039332, filed Apr. 28, 2010, the disclosure of which is incorporated herein by reference in its entirety.

BACKGROUND

1. Field of the Invention

The present invention relates to a virtual server and method for identifying a zombie, and a sinkhole server and method for integratedly managing zombie information. More particularly, the present invention relates to a method of identifying a zombie host infected with a malicious bot and performing a malicious action, a virtual server for performing the method, a method of recognizing the scale and distribution of zombies by analyzing zombie information obtained from such a virtual server, and a sinkhole server for performing the method.

2. Discussion of Related Art

As Internet services have diversified lately, use of the Internet is increasing. Thus, malicious code, such as computer viruses and Internet worms, is widespread over the Internet and causes extensive damage to Internet users. In particular, distributed denial of service (DDoS) attacks are considered a serious problem, in which multiple computers infected with a bot (referred to as "botnets"), that is, malicious code, explosively increase traffic toward a specific web server and hinder the web server from normally operating.

A computer infected with a bot is controlled by a hacker to perform a malicious action regardless of an intention of a user of the computer, and thus is referred to as a zombie host. To prevent infection with such a bot and a malicious action, a sinkhole server is used.

In a conventional method of preventing a malicious action using a sinkhole server, when a zombie host sends a query to a domain name service (DNS) server to obtain the Internet protocol (IP) address of the domain of a botnet control server, the IP address of a sinkhole server is transferred in response to the query to direct traffic of the zombie host to the sinkhole server and prevent a malicious action thereafter. However, this method has a problem in that it can only handle zombie hosts querying the domains of known botnet control servers.

SUMMARY OF THE INVENTION

The present invention is directed to providing a virtual server for identifying a zombie at the front end of web servers, which are main targets of distributed denial of service (DDoS) attacks, to identify an unauthorized host as a zombie and prevent access to the web servers.

The present invention is also directed to analyzing information on zombie hosts identified by a virtual server and recognizing the scale and distribution of zombies to prepare for the following attack.

One aspect of the present invention provides a virtual server for identifying a zombie including: an authentication processing module for authenticating a host using a completely automated public Turing test to tell computers and humans apart (CAPTCHA) test and providing a cookie to the authenticated host when a web server access request message received from the host does not include a cookie; a cookie value verification module for extracting a cookie value from the web server access request message and verifying the extracted cookie value when the web server access request message includes a cookie; a web page access inducement module for inducing the host to access a web server when the cookie value is verified; and a zombie identification module for blocking access of the host when the cookie value is not verified, and identifying the host as a zombie when the number of blocking operations exceeds a threshold value.

Another aspect of the present invention provides a sinkhole server including: a duplicated Internet protocol (IP) removal module for collecting IP addresses of zombies provided by a virtual server, which is disposed at the front end of a web server and identifies a zombie attempting to access the web server, and removing a duplicated IP address from the IP addresses; a zombie scale determination module for calculating the total number of the IP addresses except the duplicated IP address to determine the scale of zombies; a geographical distribution recognition module for recognizing geographical distribution of the zombies using geographical information implied in the IP addresses; and a zombie information database (DB) for storing the determined scale of zombies and the geographical distribution.

Still another aspect of the present invention provides a method of identifying a zombie including: determining whether a web server access request message received from a host includes a cookie; transmitting a CAPTCHA page to the host when the access request message does not include a cookie; transmitting a cookie corresponding to the IP address of the host when a correct answer to the CAPTCHA page is received from the host; extracting a cookie value from the access request message and checking whether the extracted cookie value corresponds to the IP address of the host when the access request message includes a cookie; and blocking access to a web server when the cookie value does not correspond to the IP address of the host, and identifying the host as a zombie when the number of blocking operations exceeds a threshold value.

Yet another aspect of the present invention provides a method of integratedly managing zombie information including: collecting IP addresses of zombies provided by a virtual server, which is disposed at the front end of a web server and identifies a zombie attempting to access the web server; removing a duplicated IP address from the IP addresses; calculating the total number of the IP addresses except the duplicated IP address to determine the scale of zombies; and recognizing geographical distribution of the zombies using geographical information implied in the IP addresses.

BRIEF DESCRIPTION OF THE DRAWINGS

The above and other objects, features and advantages of the present invention will become more apparent to those of ordinary skill in the art by describing in detail exemplary embodiments thereof with reference to the attached drawings, in which.

DETAILED DESCRIPTION OF EXEMPLARY EMBODIMENTS

Hereinafter, exemplary embodiments of the present invention will be described in detail. However, the present invention is not limited to the embodiments disclosed below but can be implemented in various forms. The following embodiments are described in order to enable those of ordinary skill in the art to embody and practice the present invention. To clearly describe the present invention, parts not relating to the description are omitted from the drawings. Like numerals refer to like elements throughout the description of the drawings.

Throughout this specification, when an element is referred to as "comprises," "includes," or "has" a component, it does not preclude another component but may further include the other component unless the context clearly indicates otherwise. Also, as used herein, the terms "... unit," "... device," "... module," etc., denote a unit of processing at least one function or operation, and may be implemented as hardware, software, or combination of hardware and software.

Figure 1:
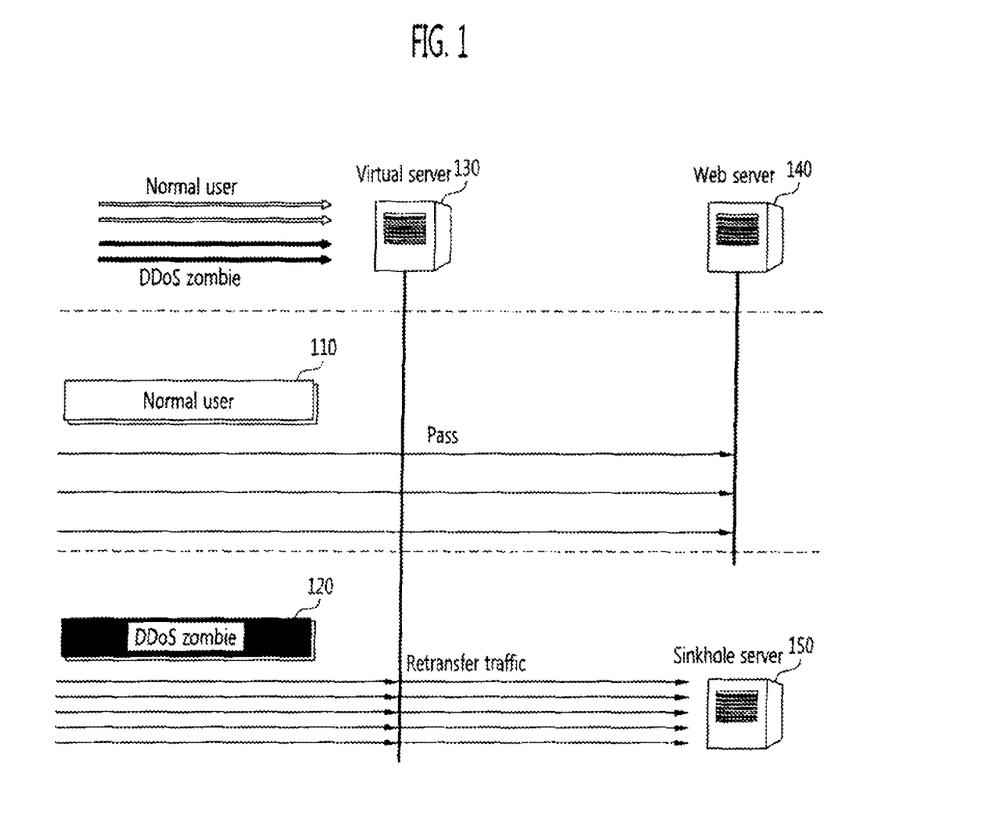
FIG. 1 conceptually illustrates traffic flow transferred to a web server and a sinkhole system via a virtual server according to an exemplary embodiment of the present invention.

FIG. 1 conceptually illustrates traffic flow between a web server, a sinkhole server, and a virtual server according to an exemplary embodiment of the present invention. As illustrated in FIG. 1, a virtual server 130 is disposed at the front end of a web server 140, authenticates a host requesting access to the web server 140, and identifies an unauthenticated host as a zombie to prevent access to the web server 140.

A normal user host 110 can access the web server 140 when it is authenticated by the virtual server 130. The virtual server 130 performs authentication using a query based on a completely automated public Turing test to tell computers and humans apart (CAPTCHA) page, and an authenticated user host can access the web server 140 using a cookie provided by the virtual server 130. The authentication process of the virtual server 130 will be described in detail later with reference to other drawings. A user host may be one of various types of computers, such as a general-use personal computer (PC), laptop computer, portable computer, and tablet PC, having a network function, and is not limited to these.

On the other hand, a zombie host 120 performing a distributed denial of service (DDoS) attack cannot pass through the authentication process of the virtual server 130. After this, traffic generated from the zombie host 120 is retransferred to a sinkhole server 150 by the virtual server 130. Although identification of a zombie performing a DDoS attack is illustrated as an example in the drawing, the present invention is not limited to identification of a zombie performing a DDoS attack. It will be appreciated by those of ordinary skill in the art that the present invention can be applied to all zombies infected with malicious bots performing malicious actions.

Meanwhile, it is illustrated in the drawing that verification of the cookies of the normal user 110 and the zombie 120 and authentication of the normal user 110 and the zombie 120 using a CAPTCHA page are performed by the virtual server 130, but the authentication process may be performed by a separate authentication server. In this case, it is checked whether a cookie is present in an access request message received from the virtual server 130. When there is no cookie, the access request message is retransferred to the authentication server, and an authentication process is performed by the authentication server. A cookie is transferred to a normal user who has been authenticated, and then the user is induced to access the virtual server 130 again. When the cookie value is verified by the virtual server 130, the normal user can access the web server 140.

Figure 2:
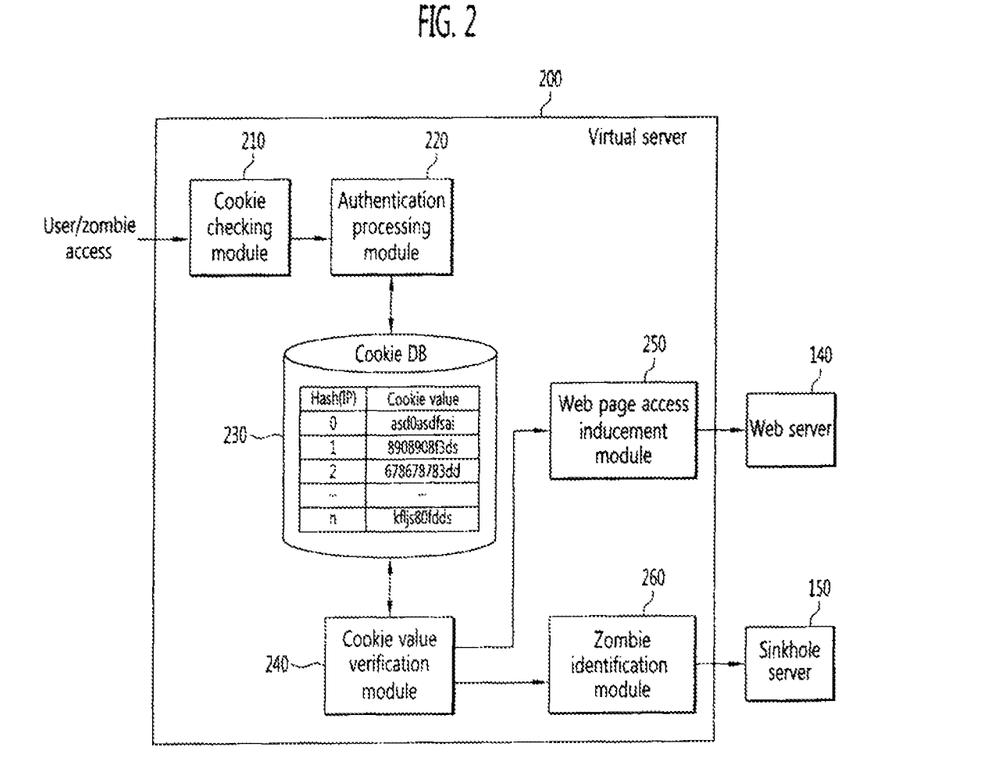
FIG. 2 is a block diagram of a virtual server for identifying a zombie according to an exemplary embodiment of the present invention.

FIG. 2 is a block diagram of a virtual server 200 for identifying a zombie according to an exemplary embodiment of the present invention. As illustrated in the drawing, the virtual server 200 includes a cookie checking module 210, an authentication processing module 220, a cookie database (DB) 230, a cookie value verification module 240, a web page access inducement module 250, and a zombie identification module 260.

The cookie checking module 210 checks whether a cookie is present in a web server access request message received from a host. A case in which there is no cookie in the web server access request message corresponds to a case in which the host attempts to access a web server 140 for the first time and thus has not yet received a cookie from the virtual server 200, or a case in which the host is a zombie.

The authentication processing module 220 authenticates the host which has transmitted the web server access request message not including a cookie using a CAPTCHA test on the host, and transmits a cookie to the authenticated host. This authentication process is performed in the network layer (L3).

The CAPTCHA test is a technique used to determine whether a user is actually a human or a computer program. In the CAPTCHA test, a code or picture intentionally distorted to prevent computers while enabling humans to recognize it is provided, and it is asked what the code or picture denotes. Since a zombie generating DDoS traffic in a web site operates by an automated program without a user's manipulation, it cannot pass the CAPTCHA test.

In an exemplary embodiment, the authentication processing module 220 repeatedly transmits a CAPTCHA test page to the host as many times as a threshold value, thereby providing opportunities to submit a correct answer to the host. When the host does not submit the correct answer in as many opportunities as the threshold value, it is identified as a zombie. The authentication processing module 220 forcibly terminates the access of the host identified as a zombie, and transfers the access request message received from the host or the Internet protocol (IP) address of the host to a sinkhole server.

Meanwhile, the authentication processing module 220 identities a host passing through the CAPTCHA test as a normal user and provides the host with a cookie to be used as an authentication key when the host accesses the web server 140 thereafter. Here, the provided cookie matches the IP address of the host. The cookie DB 230 stores a list of cookies calculated in advance according to respective IP addresses. In an example, a cookie value is generated to correspond to a hash value of the IP address of the host.

The cookie value verification module 240 extracts a cookie value from a web server access request message when the access request message received from a host includes a cookie, and verities whether the extracted cookie value has been properly provided to the host by the authentication processing module 220. The cookie value is extracted through a process of finding a hypertext transfer protocol (HTTP) header starting point. The cookie value verification module 240 compares the extracted cookie value and an IP-specific cookie value stored in the cookie DB 230 to verify it.

The web page access inducement module 250 provides a web page of the web server 140 requested by the host when the cookie value is verified, thereby inducing the host to access the web server 140 and relaying the connection between the host and the web server 140.

The zombie identification module 260 blocks access of the host when the cookie value is not verified, and identifies the host as a zombie when the number of blocking operations exceeds a threshold value. Also, the zombie identification module 260 retransfers a message received from the host identified as a zombie to a sinkhole server 150, or transfers the IP address of the host identified as a zombie to the sinkhole server 150. To reduce network load in an exemplary embodiment of the present invention, the IP addresses of hosts identified as zombies may be collected, and then the collected information may be transferred to the sinkhole server 150.

Meanwhile, in the above-described exemplary embodiment, the authentication processing module 220 is included in the virtual server 200. However, in another exemplary embodiment of the present invention, an authentication function performed by the authentication processing module 220 may be performed by an authentication server separate from the virtual server 200. In this case, the cookie checking module 210 of the virtual server 200 may check whether a cookie is present in an access request message received from a host. When there is no cookie, the cookie checking module 210 may retransfer the access request message to the authentication server, so that the authentication server performs an authentication process. After transferring a cookie to a normal user who has been authenticated, the authentication server may induce the normal user to access the virtual server 200 again.

Figure 3:
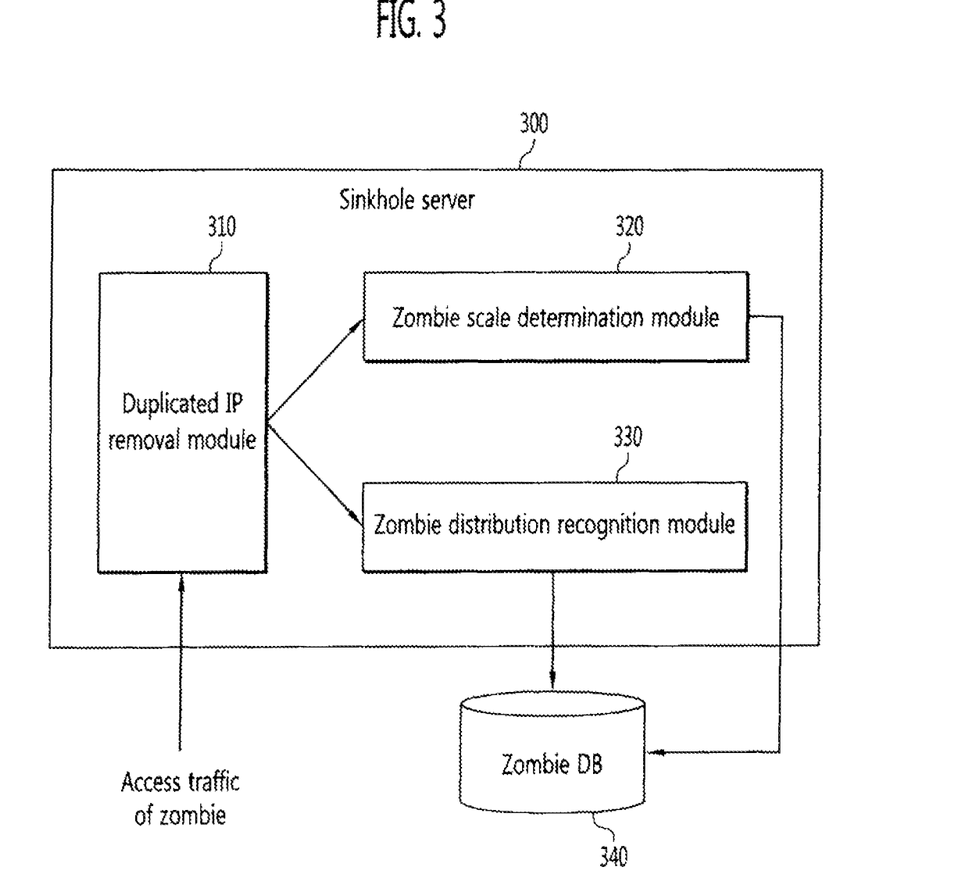
FIG. 3 is a block diagram of a sinkhole server according to an exemplary embodiment of the present invention.

FIG. 3 is a block diagram of a sinkhole server according to an exemplary embodiment of the present invention. As shown in the drawing, a sinkhole server 300 includes a duplicated IP removal module 310, a zombie scale determination module 320, a zombie distribution recognition module 330, and a zombie information DB 340.

In the example of FIG. 2, one virtual server and one web server have been described for convenience. However, a plurality of virtual server s according to an exemplary embodiment of the present invention can be disposed at the front end of a plurality of web servers, which are main targets of DDoS attacks, identifie a host failing in authentication as a zombie, and transfer traffic received from the zombie or the IP address of the zombie to the sinkhole server 300. The sinkhole server 300 integratedly manages information on zombies received from a plurality of virtual servers 200 to recognize the overall scale and geographical distribution of zombies. Thus, traffic flow of the corresponding botnets can be monitored in the aspect of control technology, and it is possible to prepare for the following attack.

To be specific, the duplicated IP removal module 310 collects the IP addresses of zombies transferred from a plurality of virtual servers, and removes duplicated IP addresses from the collected IP addresses. Alternatively, when traffic generated by zombies other than the IP addresses of the zombies is retransferred as it is from virtual servers, an IP address extraction module (not shown) which extracts an IP address from traffic may be additionally required.

The zombie scale determination module 320 calculates the total number of the IP addresses from which the duplicated IP addresses are removed by the duplicated IP removal module 310, thereby determining the scale of zombies.

The zombie distribution recognition module 330 recognizes the worldwide geographical distribution of zombies using geographical information (e.g., country, town and area information) implied in IP addresses.

The zombie information DB 340 stores the total number of zombies calculated by the zombie scale determination module 320 and the geographical distribution recognized by the zombie distribution recognition module 330. The zombie information DB 340 is periodically updated according to the operation results of the zombie scale determination module 320 and the zombie distribution recognition module 330.

Figure 4:
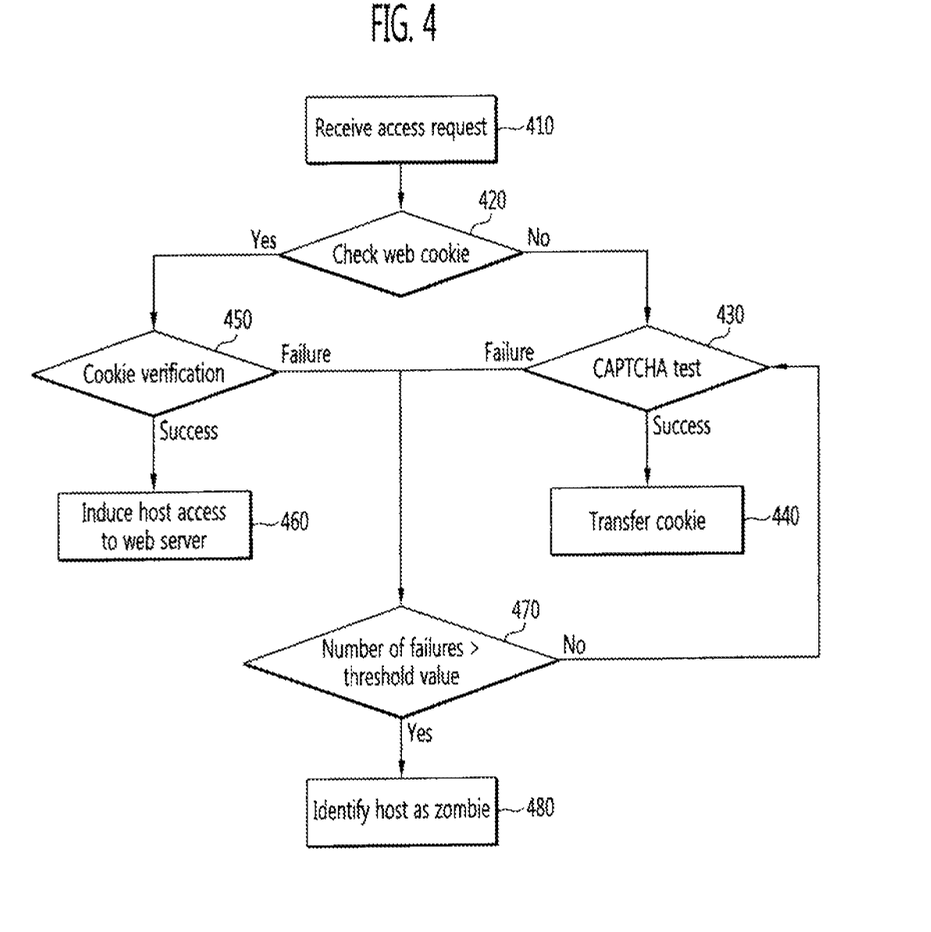
FIG. 4 is a flowchart illustrating a process of identifying a distributed denial of service (DDoS) zombie performed by a virtual server according to an exemplary embodiment of the present invention.

FIG. 4 is a flowchart illustrating a process of identifying a DDoS zombie performed by a virtual server according to an exemplary embodiment of the present invention.

First, when an initial web page access request message is received from a user (host) (step 410), a virtual server checks whether or not a cookie is present in the access request message (step 420).

When it is checked in step 420 that there is no cookie, the virtual server performs user authentication by transmitting a CAPTCHA page to the user and causing the user to submit a correct answer to a question (step 430), and transmits a cookie to the authenticated user (step 440).

The corresponding cookie value is obtained from a cookie DB storing IP-specific cookie values. When the user accesses the corresponding web server thereafter, he/she may include the cookie in an access request message to use the cookie as an authentication key.

On the other hand, the virtual server repeatedly transmits a CAPTCHA page to the user who does not submit the correct answer and fails in authentication, thereby providing as many opportunities to submit the correct answer as a threshold value. When it is determined that the number of failures exceeds the threshold value (step 470), the virtual server identifies the user as a DDoS zombie and retransfers an access request message received from the zombie to a DDoS sinkhole (step 480).

When it is checked in step 420 that a web cookie is present, the virtual server extracts and compares a cookie value with the cookie DB to verify it (step 450).

When the web cookie is verified in step 450, the virtual server identifies the user as a normal user, induces the user to access the web server, and relays communication between the user and the web server (step 460).

On the other hand, when the web cookie is not verified in step 450, the virtual server determines whether the number of times that the virtual server fails to verify a cookie of the user exceeds the threshold value (step 470). When the number of failures exceeds the threshold value, the virtual server identifies the user host as a DDoS zombie, blocks access to the web server, and retransfers an access request message received from the host to the DDoS sinkhole (step 480).

Figure 5:
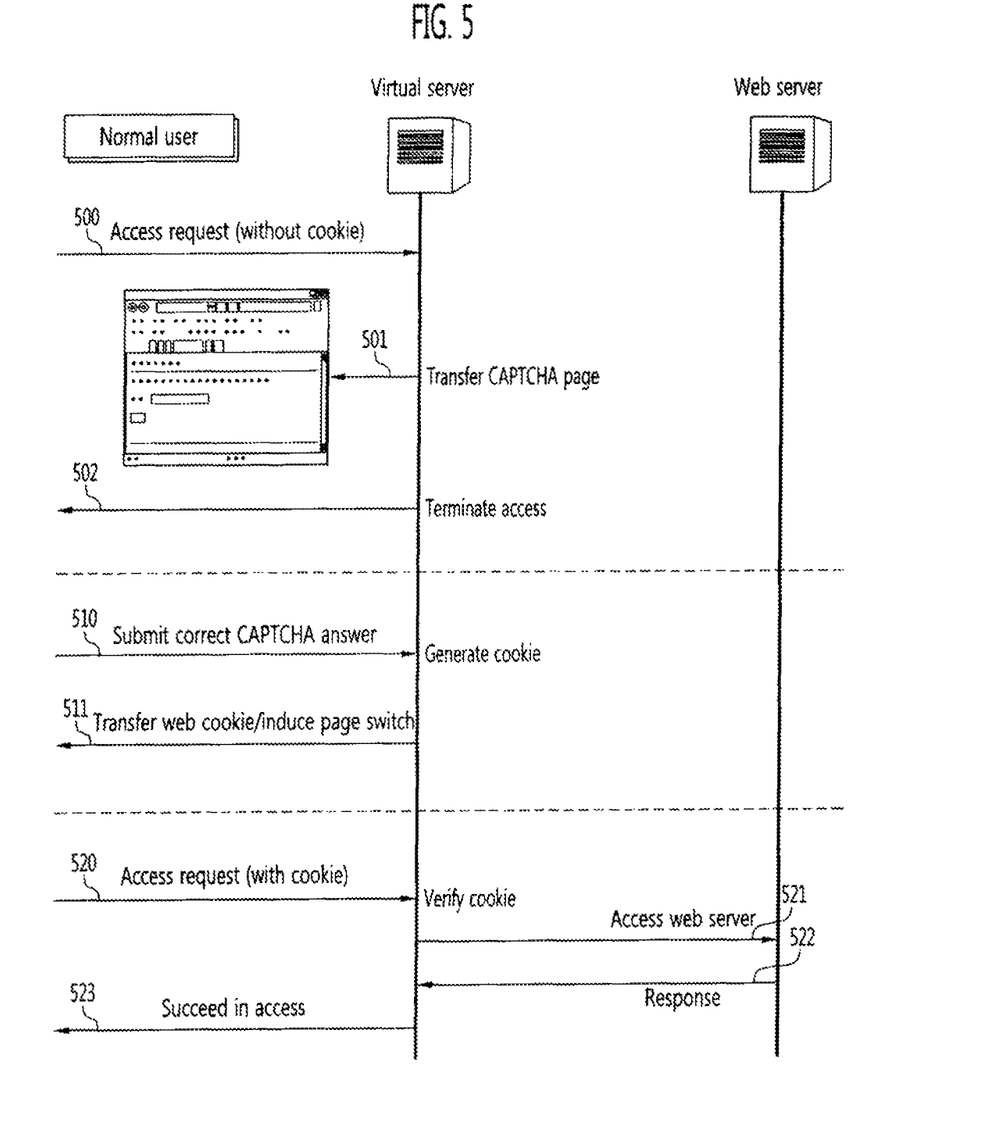
FIG. 5 illustrates access traffic control flow of a normal user according to an exemplary embodiment of the present invention.

FIG. 5 illustrates access traffic control flow of a normal user according to an exemplary embodiment of the present invention. As illustrated in the drawing, an access request message not including a cookie is received from a normal user host which attempts to access a web server for the first time (500).

When the access request message is received from the host, a virtual server transfers a CAPTCHA page to the host (501). At this time, access of the user is terminated (502).

When a correct answer to the CAPTCHA page is submitted by the host (510), the virtual server generates a cookie corresponding to the IP address of the host, and transfers the cookie to the host while inducing the host to switch to the corresponding web page of a web server (511).

After this, the user transmits an access request message including the cookie to access the web server (520). The virtual server receiving the access request message including the cookie verifies a cookie value, and relays connection between the web server and the user when the cookie value is verified (521). The virtual server receives a response of the web server (522), and transfers the response to the user (523).

Alternatively, an access request message including a cookie may be directly received from the web server. In this case, the web server may verify the cookie value and directly reply to the host.

Figure 6:
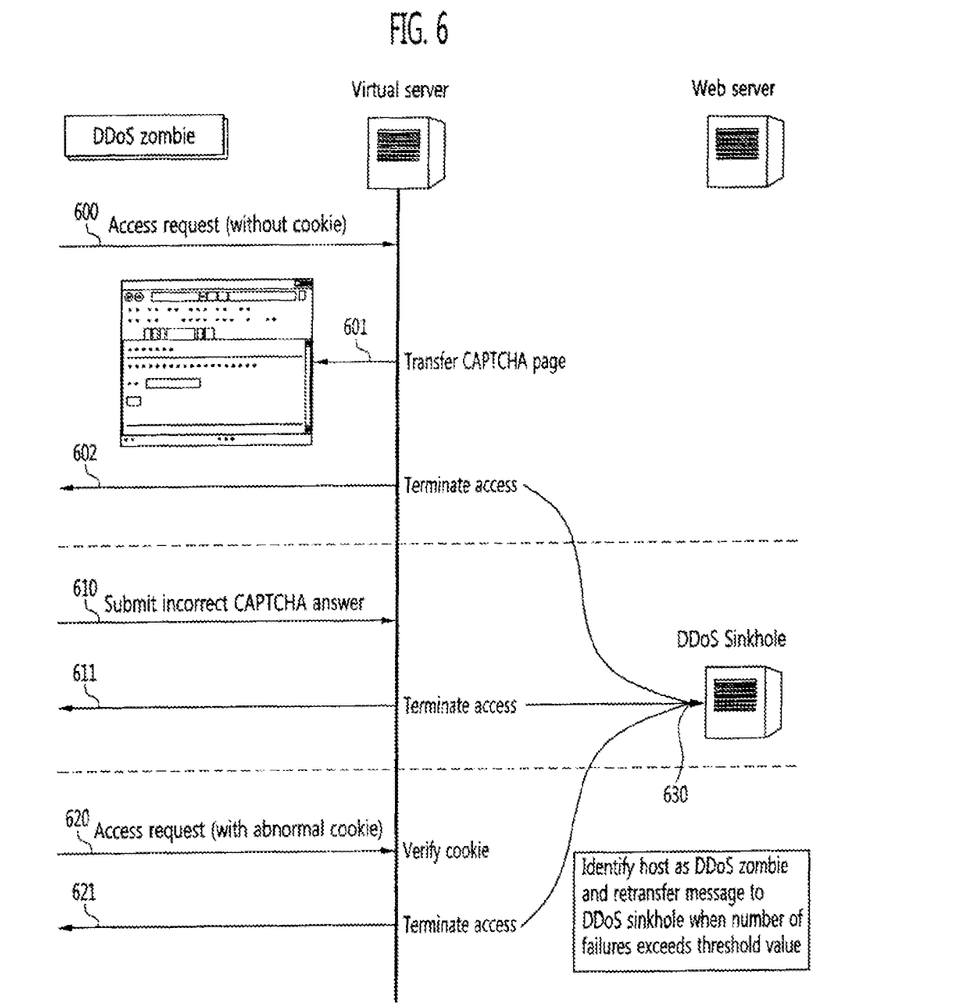
FIG. 6 illustrates access traffic control flow of a host identified as a zombie according to an exemplary embodiment of the present invention.

FIG. 6 illustrates access traffic control flow of a host identified as a zombie according to an exemplary embodiment of the present invention. An access request message not including a cookie is received from the host (600).

When the access request message is received, a virtual server transfers a CAPTCHA page to the user (601). At this time, the access of the user is terminated (602).

When an incorrect answer is received from the host (610), the virtual server forcibly terminates the access (611). When an access request including an abnormal cookie is received from the host (620), the virtual server performs cookie verification to check that the cookie is abnormal, and forcibly terminates the access (621).

When the number of times that the access of the host is forcibly terminated exceeds a threshold value, the virtual server identifies the host as a DDoS zombie, and retransfers an access request message received from the host to a DDoS sinkhole (630).

Using a virtual server according to an exemplary embodiment of the present invention, it is possible to identify zombie hosts abnormally accessing a web server and analyze the scale of botnets launching DDoS attacks in real time. Traffic of a host identified as a zombie by each virtual server can be brought to a DDOS sinkhole server and integratedly managed. Also, the IP addresses of hosts identified as DDoS zombies can be registered with the firewall of the web server, and attacks can be rapidly blocked. Consequently, information on the scale and distribution of botnets can be obtained by integrated zombie scale determination and distribution recognition, and thus it is possible to provide network information for control technology capable of monitoring traffic flow of the botnets thereafter.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A virtual server for identifying a zombie, the virtual server executed by at least one computer processor and comprising:
a cookie checking module loaded on said at least one computer processor configured to check whether a cookie is present in a web server access request message received from a host;
an authentication processing module loaded on said at least one computer processor configured to authenticate the host using a completely automated public Turing test to tell computers and humans apart (CAPTCHA) test and provide a cookie to the authenticated host when the web server access request message received from the host does not include a cookie;
a defense mechanism trigger module loaded on said at least one computer processor configured to trigger a defense mechanism (a cookie value verification, a web page inducement, a zombie identification) when a current traffic statistics value (TCP SYN packet count, UDP packet count, ICMP packet count) is greater than a predefined threshold value and bypass a request traffic to the web server when the current traffic statistics value is less than the threshold value;
a CAPTCHA generation module loaded on said at least one computer processor configured to generate a different CAPTCHA value whenever the host requests to access;
a cookie value verification module loaded on said at least one computer processor configured to extract a cookie value from the web server access request message and verify the extracted cookie value when the web server access request message includes a cookie;
a web page access inducement module loaded on said at least one computer processor configured to induce the host to access a web server when the cookie value is verified; and
a zombie identification module loaded on said at least one computer processor configured to block access of the host when the cookie value is not verified, and identify the host as a zombie when a number of blocking operations exceeds a threshold value,
wherein when the host does not submit a correct answer to the CAPTCHA test, the authentication processing module provides as many opportunities to submit the correct answer as a threshold value, and
wherein when the host does not submit the correct answer in the as many opportunities as the threshold value, the authentication processing module identifies the host as a zombie, blocks access of the host, and transfers an access request message or an Internet protocol (IP) address of the host to a sinkhole server.

2. The virtual server of claim 1, further comprising a cookie database (DB) configured to store a cookie value corresponding to an Internet protocol (IP) address of the host.

3. The virtual server of claim 2, wherein the cookie value authentication module verifies the extracted cookie value by comparing the extracted cookie value and the cookie value stored in the cookie DB and corresponding to the IP address of the host.

4. The virtual server of claim 1, wherein the zombie identification module transfers a message received from the host identified as a zombie or an Internet protocol (IP) address of the host identified as a zombie to a sinkhole server.

5. A method of identifying a zombie, comprising:
determining whether a web server access request message received from a host includes a cookie;
transmitting a completely automated public Turing test to tell computers and humans apart (CAPTCHA) page to the host when the access request message does not include a cookie;
transmitting a cookie corresponding to an Internet protocol (IP) address of the host when a correct answer to the CAPTCHA page is received from the host;
triggering a defense mechanism (a cookie value verification, a web page inducement, a zombie identification) when a current traffic statistics value (TCP SYN packet count, UDP packet count, ICMP packet count) is greater than a predefined threshold value and bypassing a request traffic to the web server when the current traffic statistics value is less than the threshold value;
generating a different CAPTCHA value whenever the host requests to access;
extracting a cookie value from the access request message and checking whether the extracted cookie value corresponds to the IP address of the host when the access request message includes a cookie;

blocking access to a web server when the cookie value does not correspond to the IP address of the host, and identifying the host as a zombie when a number of blocking operations exceeds a threshold value, repeatedly transmitting the CAPTCHA page to the host to provide as many opportunities to submit a correct answer as a threshold value when the correct answer to the CAPTCHA page is not received from the host, identifying the host as a zombie when a number of times that the host fails to submit the correct answer exceeds the threshold value, and retransferring an access request message received from the host identified as a zombie or the IP address of the host to a sinkhole server.

6. The method of claim 5, further comprising, when the cookie value corresponds to the IP address of the host, providing a web page of the web server to allow the host to access the web server.

\* \* \* \* \*